(12) United States Patent
Gelmini et al.

(10) Patent No.: US 11,725,725 B2
(45) Date of Patent: Aug. 15, 2023

(54) HYDRAULIC SYSTEM WITH SMART RELIEF VALVE AND VALVE CONTROL METHOD

(71) Applicant: DANA ITALIA S.R.L., Trentino (IT)

(72) Inventors: Mario Gelmini, Arco (IT); Lorenzo Dalla Palma, Arco (IT)

(73) Assignee: DANA ITALIA S.R.L., Arco (IT)

( * ) Notice: Subject to any disclaimer, the term of this patent is extended or adjusted under 35 U.S.C. 154(b) by 16 days.

(21) Appl. No.: 17/445,813

(22) Filed: Aug. 24, 2021

(65) Prior Publication Data
US 2023/0072877 A1    Mar. 9, 2023

(51) Int. Cl.
F16H 61/66    (2006.01)
F16H 61/02    (2006.01)
F16H 61/00    (2006.01)

(52) U.S. Cl.
CPC ..... *F16H 61/0206* (2013.01); *F16H 61/0025* (2013.01); *F16H 61/66* (2013.01); *F16H 2061/0209* (2013.01)

(58) Field of Classification Search
CPC ............. F16H 61/0206; F16H 61/0025; F16H 61/4017; F16H 2061/0209; F15B 11/165
See application file for complete search history.

(56) References Cited

U.S. PATENT DOCUMENTS

| | | | |
|---|---|---|---|
| 3,748,856 A | 7/1973 | Uozumi et al. | |
| 5,222,417 A | 6/1993 | Sato | |
| 6,978,853 B2 | 12/2005 | Bennett | |
| 7,556,120 B2 | 7/2009 | Sah et al. | |
| 7,766,139 B2 | 8/2010 | De Maziére et al. | |
| 9,102,233 B2 | 8/2015 | Knoblauch et al. | |
| 9,221,334 B2 | 12/2015 | Knoblauch | |
| 9,789,754 B2 | 10/2017 | Zhu et al. | |
| 10,889,205 B2 | 1/2021 | Hettrich et al. | |
| 2006/0068969 A1* | 3/2006 | Bartsch | F16H 61/0206 477/34 |
| 2014/0372000 A1 | 12/2014 | Rozycki et al. | |

FOREIGN PATENT DOCUMENTS

| | | |
|---|---|---|
| CN | 202132412 U | 2/2012 |
| JP | 2002337719 A | 11/2002 |

OTHER PUBLICATIONS

Shi, R. et al., "Analysis of Dynamic Characteristics of Pressure-Regulating and Pressure-Limiting Combined Relief Valve," Mathematical Problems in Engineering, vol. 2021, No. 3486143, Mar. 29, 2021, 13 pages.

* cited by examiner

*Primary Examiner* — Kenneth Bomberg
*Assistant Examiner* — Daniel S Collins
(74) *Attorney, Agent, or Firm* — McCoy Russell LLP

(57) ABSTRACT

Methods and systems for a transmission are provided herein. In one example, a hydraulic system is provided that includes a boost pump, a relief valve in fluidic communication with the boost pump and a reservoir, and a plurality of control valves in fluidic communication with the boost pump, positioned downstream of the relief valve, and in fluidic communication with a plurality of hydraulic devices. The hydraulic system further includes a controller designed to actively adjust a position of the relief valve based on an aggregate hydraulic pressure demand of the plurality of hydraulic devices to alter a boost pressure of a hydraulic fluid supplied to the plurality of control valves.

18 Claims, 5 Drawing Sheets

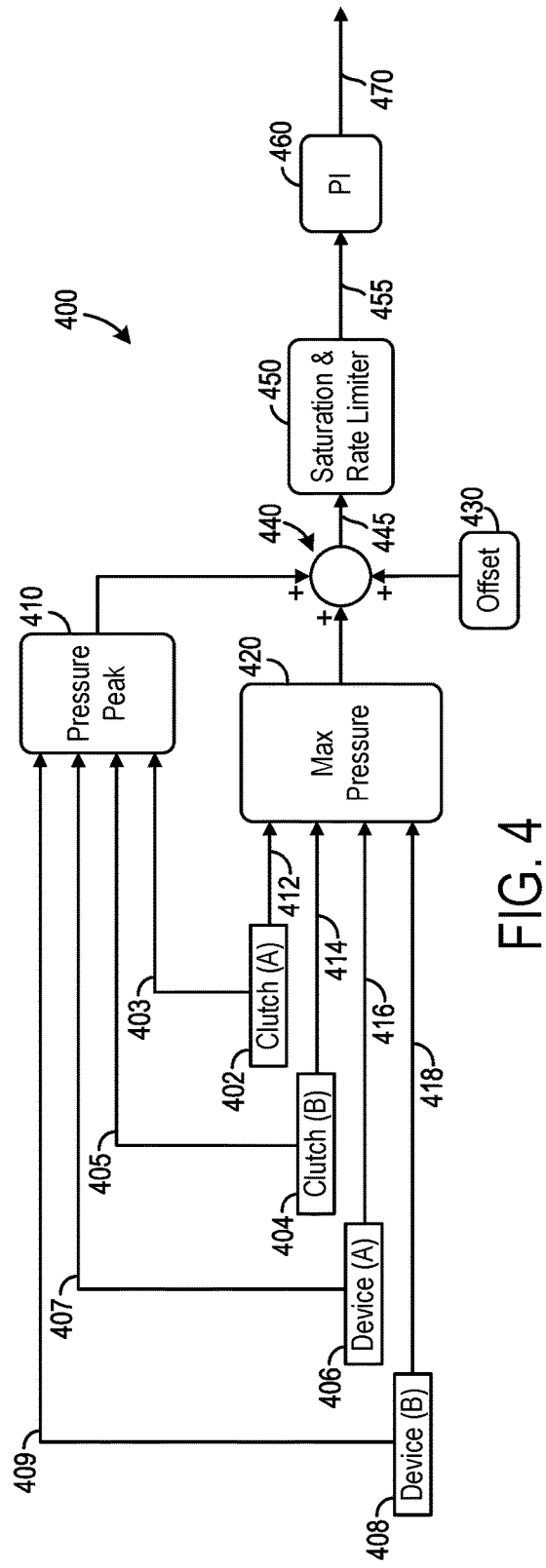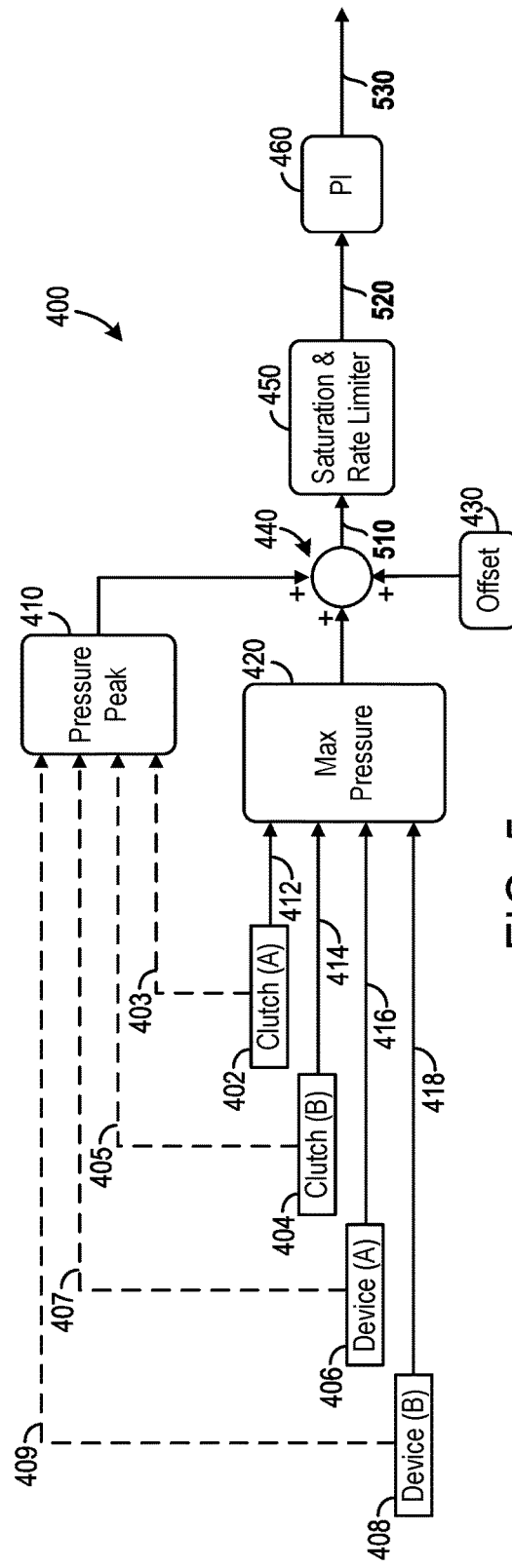

HYDRAULIC SYSTEM WITH SMART RELIEF VALVE AND VALVE CONTROL METHOD

TECHNICAL FIELD

The present disclosure relates to a hydraulic system in a transmission with a controllable pressure relief valve and a control strategy for adjusting a hydraulic pressure therein.

BACKGROUND/SUMMARY

Vehicle powertrains include hydraulic control systems to manage operation of a variety of hydraulic devices, such as clutches and pumps. In certain hydraulic systems, pumps are provided to deliver a baseline pressure to the control valves of the clutches and pumps. To maintain the supply pressure of the valves at a desired pressure, relief valves are positioned downstream of the pump and upstream of clutch control valves to permit fluid to be bled off the line. Typically, the pump displacement is selected to meet maximum flowrate demands of all the hydraulic device at a design pressure. However, the hydraulic devices may only use the maximum flowrate for a small window of gearbox operation. As such, a relatively high amount of energy is wasted in the form of pumping losses due to the hydraulic devices not using all the oil provided by the pump at the design pressure, which causes the pressurized oil to circulate through the relief valve back to a tank.

US 2006/0068969 A1 to Bartsch teaches a hydraulic control system in a transmission with a main pressure relief valve that permits oil from a control valve manifold to drain back to a fluid reservoir. The main pressure relief valve is proactively controlled in anticipation of a shift event in the transmission.

The inventors have recognized several issues with the pressure relief valve control strategy disclosed by Bartsch. Bartsch's hydraulic system has narrow applicability to hydraulically controlled clutches and is not able to be used with other hydraulic devices such as hydrostatic pumps that place additional hydraulic demands on the system. As such, Bartsch's system may be incompatible with other types of automatic transmissions such as hydromechanical transmissions. Further, Bartsch's control strategy does not recognize the variance in pressure demands associated with an initial piston filling stage and a subsequent clutch engagement stage. Bartsch's system may consequently experience pumping losses when the pressure demands of the manifold for the clutch valve are overpredicted, or, conversely, shifting performance may suffer when the desired manifold pressure is underpredicted. The inventors have further recognized an unmet need to decrease torque absorbed by a transmission gearbox during engine cranking.

To address at least a portion of the issues with previous hydraulic systems, the inventors have developed a hydraulic system in a transmission. In one example, the hydraulic system includes a boost pump and a relief valve in communication with the boost pump and a reservoir. The hydraulic system further includes multiple control valves in fluidic communication with the boost pump, positioned downstream of the relief valve, and in fluidic communication with a plurality of hydraulic devices. The hydraulic system further includes a controller designed to actively adjust a position of the relief valve based on an aggregate hydraulic pressure demand of the hydraulic devices to alter a boost pressure of a hydraulic fluid supplied to the control valves. In this way, the hydraulic system is able to effectively deliver a boost pressure that fulfills the pressure demands of a group of different hydraulic components, such as multiple clutches and a hydrostatic pump, while decreasing pumping losses in the system by reducing the boost pressure from the design value down to a controlled value. Transmission efficiency is consequently increased.

In another example, triggers (e.g., shift and flow triggers), indicative of anticipated device states correlated to hydraulic pressures demands, may be used to calculate the aggregate pressure demand of the hydraulic devices. For instance, for a hydraulic pump, a flow trigger may be indicative of a high flowrate event such as a rapid change in the pump's swash plate angle. As such, when a flow trigger of a hydraulic pump is present, the aggregate hydraulic pressure demand may be increased accordingly. In this way, imminent pressure demands of the hydraulic device are predicted to increase the accuracy of the aggregate hydraulic pressure demand calculation. Consequently, high hydraulic device performance (e.g., smooth transmission ratio adjustment with less latency) may be achieved while the boost pressure is dropped from a design value to a control value, to diminish losses.

In yet another example, a hydraulic system controller may be designed to, during engine cranking, operate the relief valve to decrease the boost pressure to a lower pressure than is supplied during normal engine operation. To carry out this boost pressure reduction, the hydraulic devices may be controlled to a prefill pressure level and the relief valve is adjusted to achieve a low boost pressure in response to the controller receiving engine cranking information. In this way, the hydraulic system may decrease the torque absorbed by a gearbox in the transmission during engine cranking operation. Transmission efficiency may therefore be further increased, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 illustrates a control architecture and strategy for operating a relief valve.

FIG. 5 illustrates a use-case hydraulic system control strategy for engine cranking.

DETAILED DESCRIPTION

The following description relates to a hydraulic system for a transmission and a control technique for adjusting a boost pressure according the hydraulic pressure demands (e.g., real-time demands) of a group of hydraulic components in the system, such as clutches and one or more hydrostatic pumps. The hydraulic system may therefore decrease the boost pressure from a design value to the control value, resulting in decreased pumping losses in the system and transmission efficiency gains. The aggregate hydraulic pressure demands of the hydraulically operated devices may be determined using triggers (e.g., shift or flow triggers) of each of the devices that are indicative of anticipated supply pressure demands of the devices. For instance, for a hydraulic clutch a shift trigger may be present, and for a hydrostatic pump a flow trigger, indicative of an imminent swivel angle adjustment, may be present. The aggregate pressure demand may therefore be increased in order to supply the clutch with a higher target pressure and/or supply the pump with sufficient pressure for altering the pump's swivel angle. However, when the shift trigger or flow trigger are discontinued, the aggregate pressure demand may be dropped accordingly. In this way, the performance of the clutch and pump may be maintained at a high level while allowing the boost pressure to be strategically decreased, as the real-time hydraulic demands of the devices allow.

Figure 1:
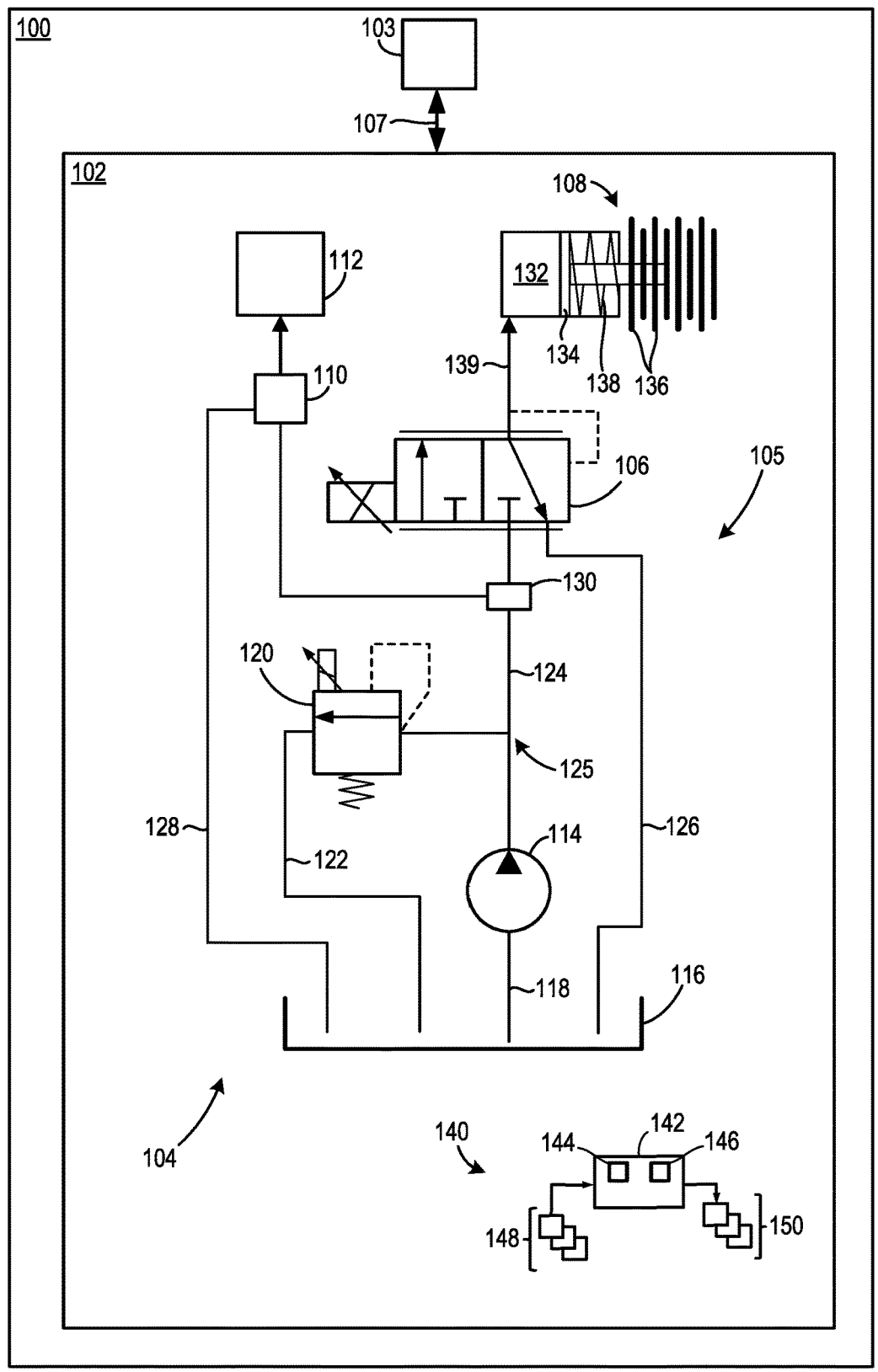
FIG. 1 is a schematic representation of a vehicle transmission with a hydraulic system.
Figure 2:
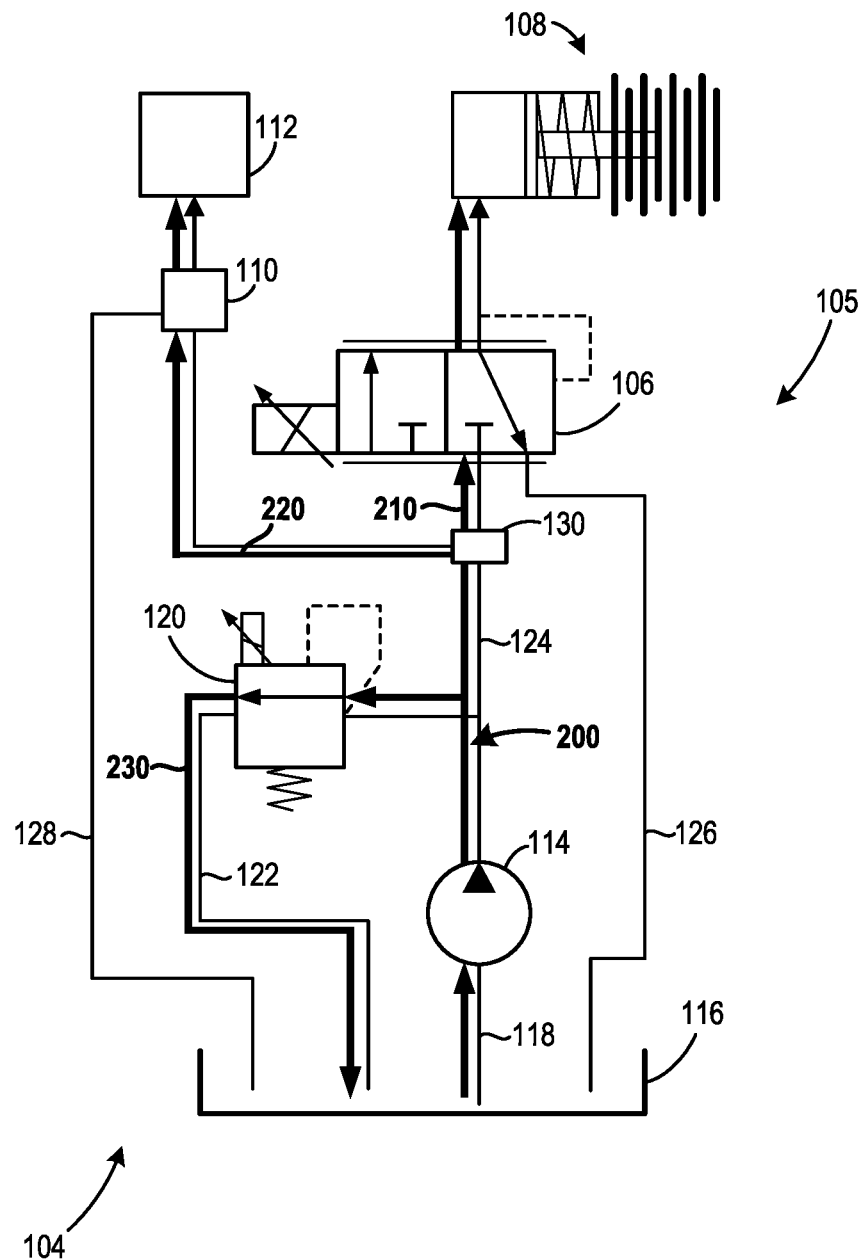
FIG. 2 shows an example hydraulic fluid flow path in the hydraulic system of FIG. 1.
Figure 3:
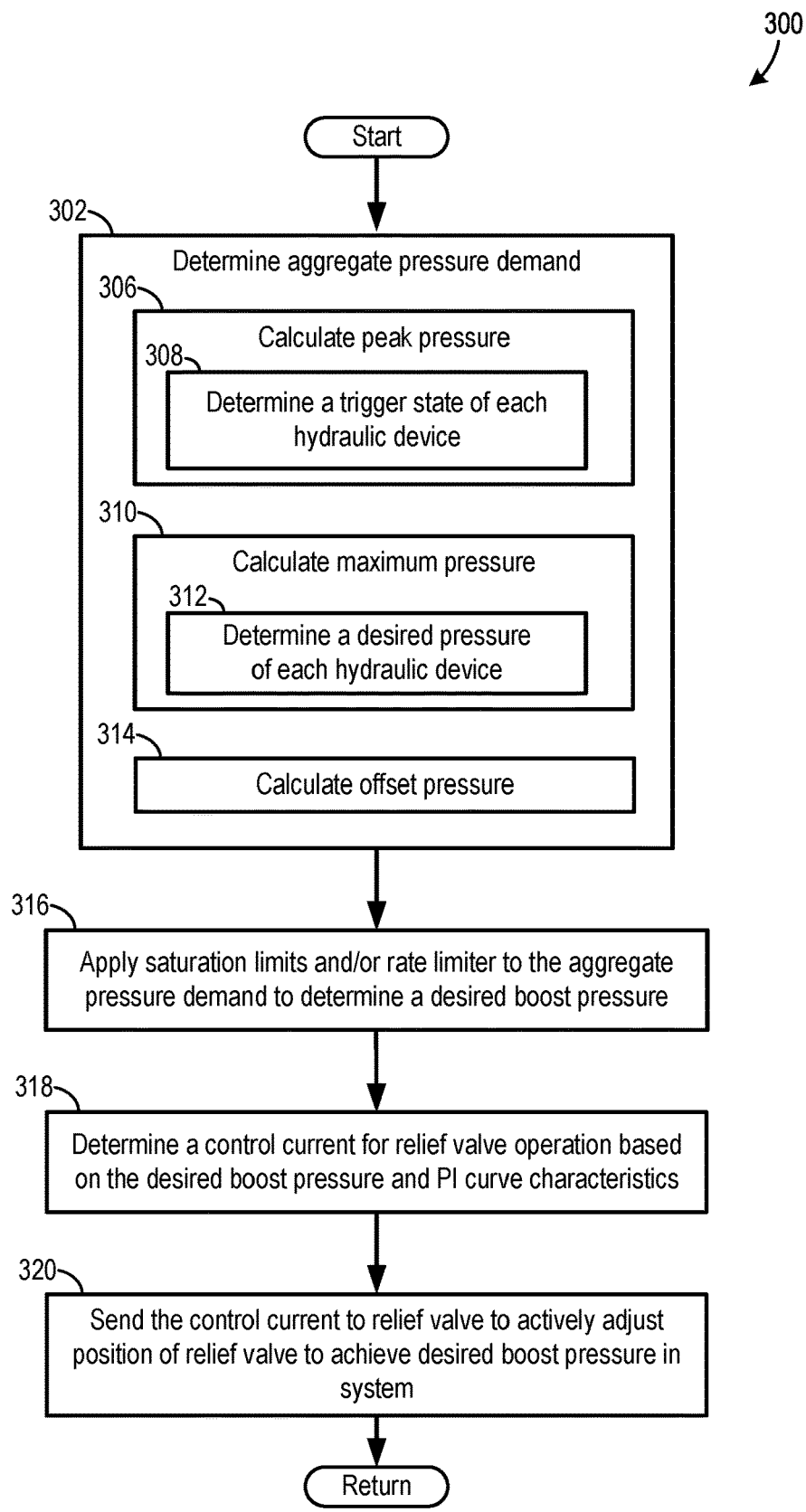
FIG. 3 depicts a method for operating a relief valve in a hydraulic system.
Figure 6:
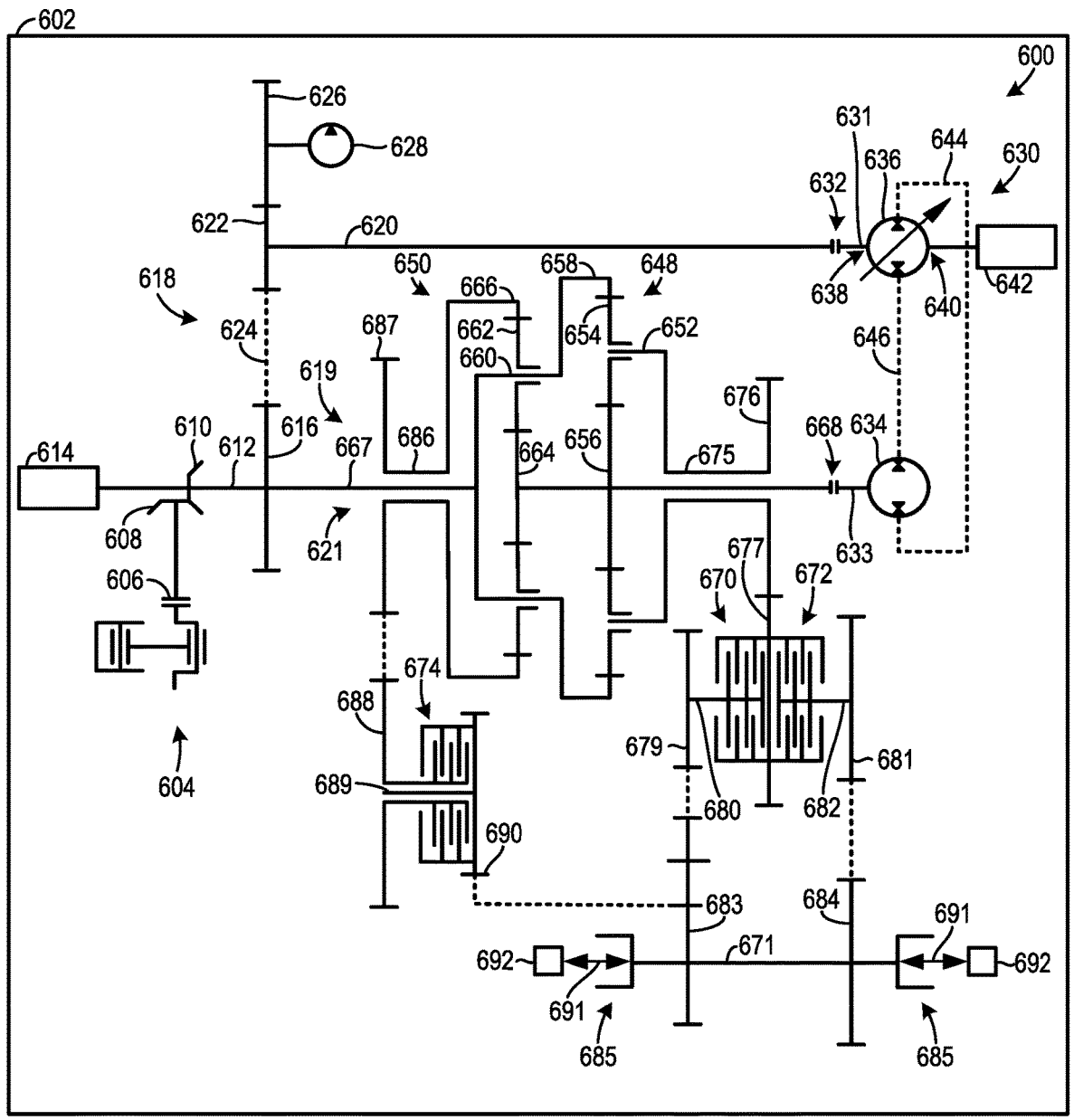
FIG. 6 is a schematic representation of a vehicle with a hydromechanical transmission.

FIG. 1 schematically illustrates a hydraulic system in a vehicle transmission, having a plurality of hydraulic devices and a relief valve in communication with a boost pump and a reservoir. FIG. 2 shows an example of a hydraulic fluid flow through the hydraulic system, where the relief valve may be operated to achieve a desired boost pressure within the hydraulic system for supplying a desired hydraulic pressure to control valves for the hydraulic devices. FIG. 3 shows an example method for operating an electronically controlled relief valve, via a control current, based on aggregate pressure demands of hydraulic devices of the system, enabling the devices to be supplied with hydraulic pressure to achieve performance targets while dropping the boost pressure from a design value to a controlled value. FIGS. 4-5 show example control architectures and strategies for determining the control current for adjusting a position of the relief valve, with FIG. 5 illustrating one particular example of a hydraulic system control scheme during engine cranking where a low pressure is desired in the hydraulic system. FIG. 6 shows a detailed example of a hydromechanical transmission.

FIG. 1 shows a schematic depiction of a vehicle 100 with a transmission 102 that includes a hydraulic system 104, according to one example described herein. In some example configurations, the vehicle 100 may be an off-highway vehicle, although on-highway vehicles have also been envisioned. An off-highway vehicle may be a vehicle whose size and/or maximum speed precludes the vehicle from being operated on highways for extended durations. For instance, the vehicle's width may be greater than a highway lane and/or the vehicle top speed may be below the highway's minimum allowable speed, for example. Industries and their corresponding operating environments in which the vehicle may be deployed include forestry, mining, agriculture, construction, etc.

The transmission 102 may be a hydromechanical variable transmission (HVT). Further, the transmission 102 may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency in relation to transmissions which operate in discrete ratios. Alternatively, the transmission 102 may be another type of continuously variable transmission (CVT) capable of seamlessly shifting through a continuous range of gear ratios, such as, for instance, a hydrostatic CVT using a variable displacement pump and a hydraulic motor to convert hydraulic pressure to rotation of an input shaft. In still other examples, the transmission may be a dual-clutch automatic transmission (DCT), employing two input clutches which connect a pair of input shafts to a motive power source. The DCT may be able to efficiently switch between gears by timing the operation of one clutch to engage as the other is disengaging so that there is little or substantially no interruption of torque supplied to the wheels during shifting, where the capability for smooth transitions between gear ratios may enhance vehicle drivability and shift quality.

The transmission 102 may include, or receive power from, a motive power source 103, which may include an internal combustion engine (e.g., spark and/or compression ignition engine), electric motor (e.g., electric motor-generator), combinations thereof, and the like. Arrows 107 indicate the flow of power between the transmission 102 and the motive power source 103.

The hydraulic system 104 may include a hydraulic circuit 105 for routing a hydraulic fluid (e.g., oil) to control various hydraulic components in the transmission 102, such as hydraulically-actuated clutches, hydrostatic pumps, hydraulic motors, and the like. To accomplish this routing, the hydraulic system 104 may include a plurality of fluid distribution components, which may include conduits, valves, filters, and the like.

In the example illustrated in FIG. 1, the hydraulic system 104 may include a first control valve 106 in fluidic communication with a hydraulic clutch 108 (e.g., a wet multi-disc clutch) and another control valve 110 in fluidic communication with a hydraulic device 112 (e.g., hydrostatic pump). As such, each of the clutch 108 and the hydraulic device 112 may be positioned downstream of the control valves 106 and 110, respectively. In other examples, the hydraulic system may be configured to supply hydraulic fluid to multiple clutches and/or multiple hydraulic devices (e.g., hydraulic pumps), each in fluidic communication with a respective control valve.

The hydraulic system 104 may further include a boost pump 114 (e.g., fixed displacement boost pump) that receives hydraulic fluid from a reservoir 116 via a pick-up line 118. The boost pump may be a positive displacement hydraulic pump having a housing and a pumping element (e.g., a reciprocating piston or rotary device) designed to deliver a pressurized hydraulic fluid during each cycle, for instance.

The hydraulic system further includes a relief valve 120 in fluid communication with reservoir 116, as indicated via fluid return line 122. The relief valve 120 is an electronically controlled valve designed for selectively discharging oil back to the reservoir 116 and regulating the boost pressure in the hydraulic system 104. Boost pressure may refer to the pressure of the fluid downstream of a junction 125 and upstream of the control valves, such as the pressure in a line 124 or the pressure in a distribution manifold 130. Further, in some examples, the relief valve 120 may be actively controlled to adjust the pressure in the hydraulic circuit 105. More particularly, the relief valve may be operated so as to selectively augment the boost pressure in the hydraulic system, permitting targeted hydraulic pressure supply for each of the hydraulic devices to achieve performance targets while decreasing pumping losses by accurately predicting system-wide pressure demands. Specific relief valve control strategies and routines are shown in FIGS. 3-5 and described in greater detail herein.

The boost pump 114 pressurizes and flows hydraulic fluid to the control valves 106, 110, via the fluid supply lines 124, for actuating the clutch 108 and the hydraulic device 112, respectively. In some examples, oil may be routed through a portion of the fluid supply lines 124 downstream from the pump 114 to a distribution manifold 130 for distributing oil to the control valves. However, in other examples, the distribution manifold may be omitted from the hydraulic system. Further, in one example, oil may be returned from the control valves 106, 110 to the reservoir 116 via the fluid return lines 126, 128, respectively. Although illustrated in FIG. 1 as separate return paths to the reservoir 116, the fluid return lines 126, 128 may, in some cases, branch from the respective control valves 106, 110 and merge into a common return line for discharging oil to the reservoir.

In one example, the clutch 108 may be a wet multi-disc clutch that has an actuator with a hydraulic chamber 132 and a piston 134 that is axially slidable in the chamber. The clutch may further include a clutch pack having interleaved separator and friction plates 136 (e.g., discs) designed to selectively engage one another, and the piston may be biased (e.g., by a spring 138) into a disengagement position (away from the clutch pack) where the plates are disengaged. Pressurized hydraulic fluid is supplied to the hydraulic chamber via a conduit 139 (fluidly connected to a port of the actuation cylinder), such that hydraulic pressure in the chamber causes the piston 134 to move into an engagement position (towards the clutch pack) to urge the separator and friction plates to engage to allow torque transmission through the clutch. However, other types of hydraulically operated clutches may be used in other examples, such as a hydraulically operated dog clutch, for instance.

In some cases, the control valve 106 may be an electronically actuated valve designed to control the supply of hydraulic fluid delivered from the pump 114 to actuate the wet multi-disc clutch 108. Further, the actuation of the clutch may include a prefilling step where the control valve 106 delivers a prefill pressure to the hydraulic piston 134. In the prefill phase of the clutch, the piston is readied for clutch engagement by filling the piston cylinder such that the clutch moves closer to its kiss point (i.e., the point at which the clutch begins to transmit torque). The prefill pressure may be lower than the engagement pressure demanded for moving the control piston to engage the clutch plates. The prefill step may occur at discrete times in anticipation of a shift event, and may decrease shift delays. However, in other examples, the control valve may deliver a prefill pressure to the clutch as a baseline during transmission operation without actively moving the clutch piston, but with the sole purpose of filling the hydraulic line with pressurized oil. This prefilling phase helps to reduce air bubbles or line instability phenomena. Additionally, the prefilling phase helps to reduce valve reaction time. Subsequently to prefill, when clutch engagement is anticipated, the clutch may enter a filling phase. For instance, clutch engagement may be anticipated when the transmission speed or load increases. In the filling phase, the clutch piston may be transitioned from the prefill position (e.g., rest position) to a kiss point or approaching the kiss point. After, the clutch reaches the kiss point, when clutch engagement is demanded, the clutch enters an engagement phase where additional hydraulic pressure applied to the piston induces clutch engagement. Controller logic may trigger the transition from the prefill phase to the filling phase and from the filling phase to the engagement phase and vice versa.

In some examples, when the hydraulic device 112 is a hydraulic pump (e.g., hydrostatic pump), the control valve 110 may be actuated to provide a pressurized flow of hydraulic fluid to the pump, which may be supplied at a high flow rate, during certain conditions. The hydrostatic pump may specifically be a variable displacement bi-directional pump included in a hydrostatic assembly of the transmission. Further, the control valve 110 may be an electronically actuated valve designed to control the supply of hydraulic fluid delivered from the boost pump 114 to the hydraulic pump 112.

The vehicle 100 may include a control system 140 with a controller 142. The controller may include a processor 144 and memory 146 holding instructions stored therein that, when executed by the processor, cause the controller to perform various methods, control techniques, etc. described herein. The processor may include a microprocessor unit and/or other types of circuits. The memory may include known data and storage mediums such as random access memory, read only memory, combinations thereof, etc.

The control system 140 may receive various signals from sensors 148 positioned in different locations in the vehicle 100 and the transmission 102. The sensors may include a pressure sensor coupled to the line 124, a temperature sensor, a clutch position sensor coupled to the clutch 108, a transmission speed sensor, a drive wheel speed sensor, an engine speed sensor, and the like. Conversely, the controller may send control signals to various actuators 150 coupled at different locations in the vehicle and transmission. For example, the controller may send signals to components of the hydraulic system 104, such as the boost pump 114, the relief valve 120, and/or the control valves 106, 110. For instance, in one particular example, the controller may send signals to actively adjust the relief valve based on hydraulic pressure demands of the clutch 108 and/or the hydraulic device 112, so as to alter a boost pressure of the hydraulic fluid supplied from boost pump 114 to the control valves 106, 110, respectively. Each of the clutch 108 and hydraulic device 112 may demand a target hydraulic pressure to operate as desired, and an algorithm may be provided to calculate in real-time the desired pressure supplied for each device by the control valve. Specific control strategies and methods for accurately determining and satisfying these hydraulic pressure demands will be expanded upon herein with reference to the examples depicted by FIGS. 3-5. Other controllable components in the vehicle and transmission system may function in a similar manner with regard to receiving command signals and actuator adjustment.

FIG. 2 illustrates an example flow path 200 in the hydraulic circuit 105 of the hydraulic system 104. The hydraulic fluid is moved from the reservoir 116 by the boost pump 114. Next, boost pump 114 moves the hydraulic fluid at a pressure demanded for operation of the clutch 108 and/or the hydraulic device 112, as shown via flow path segments 210 and 220, respectively. Specifically, flow of hydraulic fluid is provided to the clutch 108 and/or the hydraulic device 112 via control valves 106 and 110, respectively.

Flow path segment 230 indicates unspent hydraulic fluid (e.g., excess hydraulic fluid unused by the clutch and/or hydraulic device) which flows through relief valve 120 and returns to reservoir 116. In some examples, the electronically controlled relief valve may be operated based on algorithms for determining a particular pressure demand of the clutch and/or hydraulic device at any given point of operation, in order to reduce the boost pressure from a design value down to a control value. In this way, the relief valve 120 may be operated in a manner that reduces losses in the hydraulic circuit 105, thereby increasing efficiency of the hydraulic system 104 and the transmission, more generally.

A method 300 for operating a relief valve in a hydraulic system is shown in FIG. 3. The method 300 may be carried out in the hydraulic system 104 described above with regard to FIGS. 1-2. As such, the method 300 may be carried out in a hydraulic system that includes a plurality of hydraulic devices, such as hydraulic clutches, hydraulic pumps, associated control valves, a boost pump, and an electronically controlled relief valve. However, in other examples, the method 300 may be implemented in other suitable hydraulic systems. Instructions for carrying out method 300 and the methods described herein may be executed by a controller, such as controller 142 in FIG. 1, by executing instructions stored on a memory of the controller and in conjunction with signals received from sensors at the controller. The controller may employ actuators in different hydraulic system components to implement the method steps described below.

At 302, the method includes determining an aggregate pressure demand for the hydraulic devices (e.g., the hydraulic clutches and the hydrostatic pump). At a given time during operation, each of the devices may demand a specific hydraulic pressure to work as desired (e.g., maintain a desired level of performance). For instance, a hydraulic clutch may demand a comparatively high pressure supply of hydraulic fluid when a gear shift event is about to occur, and a hydrostatic pump may demand another supply of hydraulic fluid at a high flow rate for other events, such as swivel angle adjustment, in some examples. In this way, the method is designed to account for the hydraulic pressure demands of a group of devices in the system and enable a tailored supply of hydraulic pressure for desired operation thereof. The gear shift event may be anticipated based on changes in operator requested speed or torque, hydrostatic ratio, transmission speed, transmission load, and the like.

Step 302 includes steps 306, 310, and 314. At 306, the method includes calculating a peak pressure, at 310 the method includes calculating a maximum pressure, and at 314 the method includes calculating an offset pressure error.

Calculating the peak pressure for the hydraulic devices includes, at 308, determining a trigger state of each device which is indicative of an upcoming event that demands a higher hydraulic pressure and/or flow rate and determining the peak pressure of each hydraulic device using the trigger state. To elaborate, when one of the hydraulic devices is a clutch, a shift trigger may be a signal indicative of an upcoming (e.g., imminent) gear shift, where a higher hydraulic pressure is wanted. A flow trigger for the hydraulic clutch may be indicative of an upcoming piston filling event, which may occur prior to the shift event. When one of the hydraulic devices is a hydrostatic pump, a flow trigger may be a signal indicative of an upcoming event that demands a higher flow rate of hydraulic fluid, such as a rapid change in the pump's swivel angle (e.g., a quick swivel angle maneuver). These triggers therefore anticipate the aforementioned events in order to identify events that will demand higher hydraulic pressure, so as to permit the requested operations to be executed as desired without drops in performance, if wanted. As such, at step 308, a flow trigger or a shift trigger may be identified for each hydraulic device and used to calculate each device's peak pressure. Next, the peak pressures may be compared to identify the highest pressure to arrive at the aggregate peak pressure (e.g., predicted aggregate peak pressure).

Calculating the maximum pressure for each of the hydraulic devices includes, at 312, determining a desired maximum pressure (e.g., current maximum pressure) for each of the hydraulic devices. As indicated above, each of the hydraulic devices may demand a specific hydraulic pressure to operate as desired during different operations. Thus, the current desired maximum pressure for each device may be determined and compared in order to determine the maximum pressure in the system. Specifically, in one example, the maximum pressures may be compared and the highest maximum pressure may be selected as the maximum system pressure. Additionally, an offset indicative of a performance margin to cover system uncertainties may be determined at step 314. Additionally, in certain implementations, the actual boost pressure may be compared against the target pressure and this difference may be used as a feedback error.

The pressure values calculated in steps 306-314 may be compared to determine the aggregate pressure demand of the hydraulic system. Specifically, the peak pressure demand for the hydraulic devices and the maximum pressure for the hydraulic devices, may be compared to determine the higher pressure of the two values. The higher pressure serves as an aggregate (e.g., system-wide) pressure demand in the hydraulic system, accounting for the demands of each hydraulic device based on the current and anticipated operating conditions. After the aggregate pressure demand is determined, the offset may be applied to said pressure value to account for system uncertainty. For instance, in one use-case example, the aggregate pressure may be 20 bar and the offset may be 5 bar to account for system uncertainty. In such an example, the pressure to be regulated may be 20+5 bar.

In this way, the current and anticipated pressure demands of each of the hydraulic devices may be accurately and confidently determined to decrease the chance of overpredicting the target boost pressure. Additionally, underpredicting the target boost pressure may be permitted (e.g., guaranteed) because the actuators peak and maximum pressure may be communicated to this logic immediately, provided with a reasonable time anticipation. This target pressure, added with the offset, may be directly controlled in the relief valve. The actuator may therefore control the so called "control pressure", which is a delayed information of the target pressure sent to the relief valve. With this direct chain of control, and thanks to the lag between relief valve (upstream) and clutch control valve (downstream) the underprediction may be permitted (e.g., guaranteed) both in terms of time and amplitude.

Next at 316, the method includes applying saturation limits and/or rate limiter functions to the aggregate pressure demand to determine a desired boost pressure. In this way, the aggregate pressure demand may be constrained within a reasonable range (e.g., 10-30 bar, in one use-case example). In this step, saturation upper and lower pressure limits and/or maximum permitted pressure rate may be calculated to reduce the chance of (e.g., avoid) instability in the boost pressure due to the discontinuous or intermittent request of peak boost pressure. In this way, the confidence in the desired boost pressure set by the relief valve is further increased. The pressure limit and the pressure rate may be determined based on a variety of system parameters such as expected operating conditions, hydraulic line size and construction, clutch piston design, control valve characteristics, and the like.

Next, at 318, the method includes determining a control current to the relief valve in the hydraulic system based on the desired boost pressure and static pressure vs. current characteristics (PI) curve characteristics. The PI curve represents the basic design characteristics of the relief valve and provides a relationship between pressure and solenoid current. The PI curve characteristic may be a design characteristic. Specifically, the PI curve may be ascertained from a manufacturing datasheet, but may also be a static characteristic of the relief valve that is determined during a self-tuning procedure of the transmission.

At 320, the method includes sending the control current to the relief valve to actively adjust a position of the relief valve to selectively augment the boost pressure of hydraulic fluid supplied to a plurality of control valves associated with each of the hydraulic devices.

The method 300 may execute the above-described steps to actively adjust a position of the relief valve in real-time or near real-time based on the aggregate pressure demands of the hydraulic devices. In this way, the relief valve can be actively controlled to provide a boost pressure to the hydraulic devices that more aptly matches the pressure demands of the devices. As used herein, real-time may refer to a process in which input data is processed within a very small amount of time (e.g., milliseconds) so that the delay in the control scheme is small or negligible. Additionally, by regularly evaluating the operating needs of each hydraulic device, the method may provide a reliable routine for avoiding inaccurate prediction of pressure demands in the system, which may lead to inefficiencies and/or otherwise undesirable system performance. Specifically, by selectively augmenting the boost pressure in the system based on the determined pressure demands, the relief valve may be controlled to reduce losses.

FIG. 4 shows a control architecture 400 for operating an electronically controlled relief valve in a hydraulic system of a transmission, particularly for determining a control current for adjusting the relief valve according to hydraulic system information gathered and processed via the control architecture. The control strategy depicted in FIG. 4 may be carried out in hydraulic system similar to that described with regard to FIGS. 1-2.

Control architecture 400 may be implemented with a hydraulic system that includes multiple hydraulic devices: clutches 402, 404 (e.g., wet multi-plate clutches) and other hydraulic devices 406, 408 (e.g., hydraulic pumps, motors, and the like). Further, various control and processing modules are used in the control architecture 400. These modules may be implemented as instructions stored in executable memory of a controller. As such, the modules may be conceptually implemented as different blocks of software instructions. The modules include a pressure peak determination module 410 and a maximum pressure demand determination module 420, each in communication with the hydraulic devices 402, 404, 406, and 408. To elaborate, the pressure peak determination module 410 may receive trigger signals 403, 405, 407, 409 from each of the hydraulic devices 402, 404, 406, and 408, as indicated in FIG. 4. These trigger signals are indicative of anticipated (e.g., imminent) events in a respective hydraulic device which commands a higher hydraulic pressure for desired operation. As previously described, the clutches 402, 404 may command a shift trigger 403, 405, respectively, indicative of an upcoming gear shift event with significant hydraulic pressure demands at the respective clutch. Similarly, the other hydraulic devices 406, 408 may send a flow trigger 407, 409, respectively, to the peak pressure determination module. The flow triggers are indicative of an upcoming event demanding a higher (e.g., peak) hydraulic pressure at the respective device. Although the hydraulic devices 402, 404, 406, and 408 are each shown sending a trigger signal to the peak pressure determination module, only a portion of the devices may send triggers to the peak pressure module, during other operating conditions. At the pressure peak determination module 410, the peak hydraulic pressures of each device are calculated using the shift and/or flow triggers and then combined in order to calculate an aggregate peak pressure for the hydraulic system.

The hydraulic devices 402, 404, 406, and 408 may further communicate with the maximum pressure demand determination module 420 via output signals 412, 414, 416, and 418, respectively. Specifically, each of the clutches 402, 404 and other devices 406, 408 may have a desired operating pressure at any given point during operation, and output signals 412, 414, 416, 418 include information pertaining to a current desired pressure of each of the devices which is input at the maximum pressure demand determination module 420. At module 420, the pressure values from signals 412, 414, 416, and 418 are compared to determine a maximum pressure demand for the hydraulic system.

The control architecture may further include an offset pressure error module 430 that calculates the offset of the actual boost pressure and the commanded boost pressure. At a comparison module 440, the aggregate peak pressure and the system-wide maximum pressure demand, as determined at modules 410 and 420, respectively are, compared to determine the highest pressure and then the offset pressure error is applied to the selected pressure. In this way, an overall (e.g., system-wide) boost pressure demand is confidently and accurately calculated.

The overall boost pressure demand may then be sent, as indicated at 445, to a saturation and rate limiting module 450, which may put constraints on the desired boost pressure for relief valve control to prevent the desired boost pressure from reaching unreasonable values. Then, the desired boost pressure is sent from module 450, as indicated at output 455, to a PI curve module 460. The PI module 460 may evaluate the desired boost pressure at a PI function in order to calculate the control current 470 for adjusting the position of the relief valve. To expound, PI curve characteristics specific to the relief valve may be used to determine a control current for the relief valve. By electronically actuating the relief valve in this manner, the control architecture 400 is able to reliably and accurately determine a target boost pressure controlled by the hydraulic system's relief valve. In this way, the control strategy shown in FIG. 4 allows the system the achieve or maintain high performance in a wide group of hydraulic devices while increasing system efficiency when compared to systems with a passively controlled relief valve or systems which solely focus on the pressure needs of hydraulic clutches.

FIG. 5 depicts the control architecture 400 carrying out a use-case control strategy that occurs during engine cranking. Engine cranking is an engine operating period where a starter-motor or other suitable device is used to rotate the engine's crankshaft to initiate cyclical combustion operation after an engine shut-down period. One aim of this particular strategy is to decrease the torque absorbed by the transmission gearbox. Thus, the hydraulic devices 402-408 may each receive engine cranking information, whereby each of the hydraulic devices is controlled to operate at a prefill pressure level. The prefill pressure may be a minimum pressure that decreases the likelihood of degradation of pump components. As such, in one use-case example the minimum pressure may be in a range between 10 to 15 bar, the minimum pressure value may be more generally calculated based on the construction of the pump's components, the material characteristics of the pump's components, expected operating conditions, and the like.

As illustrated, the output signals 412, 414, 416, and 418 from each of the hydraulic devices 402, 404, 406, and 408, respectively, indicative of each device's current maximum pressure demand may be at a prefill pressure (e.g., 10-15 bar, in one use-case example), such that the maximum pressure demand determined at module 420 is the prefill pressure. Further, in this example, the hydraulic devices 402, 404, 406, and 408 may not send trigger signals 403, 405, 407, and 409, respectively, to the pressure peak determination module 410, as indicated via dashed lines. As such, of the hydraulic devices may be commanded to prefill levels, such that the aggregate pressure peak determined at module 410 corresponds to a prefill pressure. As such at the comparison module 440 the aggregate pressure demand may correspond to a prefill pressure or pressure range. The offset pressure calculated at module 430 may be a non-zero value, that is applied to the prefill pressure at module 440.

The overall boost pressure demand 510 during engine cranking may be output to the saturation and rate limiting module 450 and may be adjusted accordingly thereat to determine an engine cranking pressure demand 520 for the hydraulic system. As the pressure demand of each hydraulic device is at a prefill level, and the trigger signals are not commanded by any hydraulic device, it will be understood that the engine cranking boost pressure demand 520 may be a very low pressure. Next, the PI module 460 evaluates the engine cranking pressure demand 520 (e.g., using PI curve characteristics for the relief valve) to determine an engine cranking control current 530 for the relief valve, which will adjust a position of the relief valve to achieve the low pressure during engine cranking. In this way, the control current 530 may cause the relief valve to decrease the boost pressure to a much lower pressure than the pressures used during transmission operation subsequent to engine start-up. In this way, the hydraulic system's control strategy during engine cranking is able to decrease the torque absorbed by the gearbox during engine cranking in a simple yet effective manner.

FIG. 6 shows a schematic depiction of a transmission 600 (e.g., an HVT) in a vehicle 602. The vehicle 602 and the transmission 600 are examples of the vehicle 100 and the transmission 102, as depicted in FIG. 1. Therefore, the transmission 600 may include structural and/or functional features from the transmission 102, or vice versa.

The transmission 600 may function as an IVT where the transmission's gear ratio is controlled continuously from a negative maximum speed to a positive maximum speed with an infinite number of ratio points. In this way, the transmission can achieve a comparatively high level of adaptability and efficiency when compared to transmission which operate in discrete ratios.

The transmission 600 may have asymmetric maximum output speeds for forward and reverse direction. This forward-reverse speed asymmetry may enable the transmission to achieve a desired breadth of speed ranges. However, other suitable output speed variations have been contemplated, such as symmetric output speeds in the forward and reverse directions, which may however, demand the use of an additional clutch which may increase system complexity.

The transmission 600 may include or receive power from a motive power source 604. The power source 604 may include an internal combustion engine, electric motor (e.g., electric motor-generator), combinations thereof, and the like.

A torsional damper coupling 606 may be further provided in the transmission. Gears 608, 610, such as bevel gears, may be used to rotationally couple the power source 604 to an input shaft 612. As described herein, a gear may be a mechanical component which rotates and includes teeth that are profiled to mesh with teeth in one or more corresponding gears to form a mechanical connection that allows rotational energy transfer therethrough.

A mechanical power take-off (PTO) 614 may be coupled to the input shaft 612. The mechanical PTO 614 may drive an auxiliary system such as a pump (e.g., a hydraulic pump, a pneumatic pump, and the like), a winch, a boom, a bed raising assembly, etc. To accomplish the power transfer to auxiliary components, the PTO may include an interface, shaft(s), housing, and the like. However, in other examples, the PTO and/or the disconnect clutch may be omitted from the transmission. A gear 616 may be coupled to the input shaft 612. A mechanical assembly 618 is further included in the transmission 600. The mechanical assembly 618 may include the shaft 612 and/or the gear 616 as well as shaft 667, described in greater detail herein. Further, the transmission may include a shaft 620 and a gear 622 rotationally coupled to the gear 616 on the input shaft 612. Dashed line 624 and the other dashes lines depicted in FIG. 6 indicate a mechanical connection between components which facilitates rotational energy transfer therebetween.

A gear 626 meshing with gear 622 may be rotationally attached to a charging pump 628. The charging pump 628 may be designed to deliver pressurized fluid to hydraulic components in the transmission such as a hydraulic motor 634 (e.g., hydrostatic motor), a hydraulic pump 636 (e.g., hydrostatic pump), and the like. The fluid pressurized by the charging pump may additionally be used for clutch actuation and/or transmission lubrication. The charging pump may include a piston, a rotor, a housing, chamber(s), and the like to allow the pump to move fluid. The mechanical assembly 618 is rotationally coupled in parallel to a hydrostatic assembly 630 (e.g., a hydrostatic unit). Further, the hydrostatic assembly 630 may have a U-shape design where the shafts 631, 633 serve as a mechanical interface for the hydraulic pump 636 (e.g., variable displacement pump) and the hydraulic motor 634 (e.g., fixed bent axis motor), respectively, are parallel to one another and arranged on one side of the assembly. This U-shaped layout permits the hydrostatic assembly's size to be reduced and enables the use of high pressure hoses to be forgone to reduce manufacturing costs as well the chance of hydrostatic unit degradation, if desired. Still further, the hydrostatic assembly 630 may be arranged on an opposite side of the transmission as the charging pump 628 and/or axially offset from clutches 670, 672. Arranging the hydrostatic assembly in this manner permits the width and length of the transmission to be reduced and allows the installation of the transmission in the vehicle to be simplified. Further, the motor and the pump in the hydrostatic assembly may be enclosed a common housing to increase transmission compactness.

The coupling of the hydrostatic assembly to the mechanical assembly enables the transmission to achieve power split functionality in which power may synchronously flow through either path to additively combine or recirculate power through the system. This power split arrangement enables the transmission's power flow to be highly adaptable to increase efficiency over a wide range of operating conditions. Thus, the transmission may be a full power split transmission, in one example.

The mechanical assembly 618 may include multiple mechanical paths that are coupled in parallel to the hydrostatic assembly. To elaborate, the shaft 667 may serve as a junction for a first mechanical path (e.g., branch) 619 and a second mechanical path (e.g., branch) 621. The first mechanical path 619 may provide rotational energy transfer capabilities from an interface of the hydrostatic assembly 630 to a ring gear 658 of a first planetary gear set 648, during certain operating conditions. Additionally, the second mechanical path 621 may provide rotational energy transfer capabilities from the interface of the hydrostatic assembly 630 to a carrier 660 of a second planetary gear set 650.

The hydrostatic assembly 630 includes the hydraulic motor 634 and the hydraulic pump 636. Further, the hydraulic pump 636 may include a first mechanical interface 638 and a second mechanical interface 640. The first mechanical interface 638 may be rotationally coupled to a mechanical bushing 632 and the second mechanical interface 640 may be rotationally coupled to another mechanical PTO 642. Again, the mechanical PTO may be used to drive an auxiliary vehicle system such as an air compressor, a mechanical arm or boom, an auger, etc. In this way, the transmission may be adapted for a variety of end-use operating environments. Providing multiple PTOs, in the arrangement depicted in FIG. 6, enables the transmission system to meet end-use design goals in a variety of different types of vehicles, if wanted. As such, the system's applicability is expanded and the customer appeal of the transmission is increased. However, in other examples, the PTOs 614 and/or 642 may be omitted from the transmission.

The hydraulic pump 636 may be a variable displacement bi-directional pump, in one example. Further, the pump may be an axial piston pump, in one instance. To elaborate, the axial piston pump may include a swash plate that interacts with pistons and cylinders to alter the pump's displacement via a change in swivel angle, in one specific example. However, other suitable types of variable displacement bi-directional pumps have been contemplated.

The hydraulic motor 634 may be a fixed displacement bi-directional motor (e.g., fixed bent axis motor). The fixed bent axis motor is relatively compact when compared to variable displacement motors. The system can therefore achieve greater space efficiency and pose less space constraints on other systems in the vehicle, if desired. However, alternate types of pumps and/or motors may be used, if motor adjustability is favored at the expense of compactness, for instance.

Hydraulic lines 644, 646 are attached to hydraulic interfaces in each of the motor and pump to enable the hydrostatic assembly to provide additive and power circulation functionality with regard to the mechanical branches arranged in parallel with the hydrostatic assembly 630. For example, in an additive power mode, power from both the hydrostatic and mechanical assemblies is combined at one of the planetary gear sets and delivered to the transmission output. Therefore, the hydraulic pump 636 and the motor 634 may be operated to flow power to the sun gears of either planetary assembly from the hydraulic motor. In a recirculating power mode, power is recirculated through the hydrostatic assembly. Therefore, in the recirculating power mode, power flows from the hydrostatic assembly to the shaft 620.

The transmission 600 further includes the first planetary gear set 648 and the second planetary gear set 650. The first planetary gear set 648 may include a carrier 652 on which planet gears 654 rotate. The planet gears 654 may mesh with a sun gear 656 and the ring gear 658. Likewise, the second planetary gear set 650 may include the carrier 660, planet gears 662, a sun gear 664, and a ring gear 666. Therefore, the second planetary gear set 650 may again be a simple planetary gear set. Further, bearings arranged between the planet gears and the carrier in each planetary arrangement may facilitate rotation thereof. The sun gears and/or shafts to which they are attached may further have bearings coupled thereto. The bearings may be roller bearings (e.g., needle roller bearings), ball bearings, or other suitable types of bearings that enable component rotation while constraining other relative motion.

The carrier 660 of the second planetary gear set 650 may be rotationally coupled to the ring gear 658 of the first planetary gear set 648. Further, the carrier 660 of the second planetary gear set 650 may be rotationally coupled to a shaft 667. The shaft 667 may extend through a central opening in an extension 686, described in greater detail herein. This rotational attachment scheme may be conceptually described as a formation of mechanical branches attached in parallel to the hydrostatic assembly 630.

As described herein a parallel attachment between components, assemblies, etc., denotes that the input and output of the two components or grouping of components are rotationally coupled to one another. This parallel arrangement allows power to recirculate through the hydrostatic assembly, during some conditions, or be additively combined from the mechanical and hydrostatic branches, during other conditions. As a result, the transmission's adaptability is increased, which allows gains in operating efficiency to be realized, when compared to purely hydrostatic transmissions.

The sun gears 656, 664 of the first and second planetary gear sets 648, 650 may be rotationally coupled (e.g., directly attached) to one another. Attaching the sun gears in this manner may enable the transmission to achieve a desired gear ratio, compactness, and efficiency.

The hydraulic motor 634 may be rotationally coupled to the sun gear 656 via a mechanical bushing 668, for instance. The transmission 600 further includes a reverse clutch 670, a first forward drive clutch 672, and a second forward drive clutch 674. The clutches 670, 672, 674 may be positioned near to an output shaft 671 and downstream of the planetary assembly. Arranging the clutches in this location allows a targeted compromise between clutch size and clutch speed. For instance, relatively high clutch speeds may generate higher power losses. Further, the reverse clutch 670 and the first forward drive clutch 672 may be arranged adjacent and coaxial to one another. In one particular example, the clutches may have a similar design to reduce manufacturing complexity. This twin clutch arrangement therefore permits manufacturing costs to be reduced and increases the transmission's compactness.

The clutches 670, 672, 674 may be friction clutches that each includes two sets of plates. The clutch plates may rotate about a common axis and are designed to engage and disengage one another to facilitate selective power transfer to downstream components. In this way, the clutches may be closed and opened to place them in engaged and disengaged states. In the disengaged state, power does not pass through the clutch. Conversely in the engaged state, power travels through the clutch during transmission operation. The carrier 652 may include an extension 675 with a gear 676 that meshes with a gear 677. The gear 677, in the illustrated example, is rotationally coupled to the reverse clutch 670 and the first forward clutch 672. The reverse clutch 670 and the first forward clutch 672 are shown arranged adjacent to one another and may share a common rotational axis. Because of this proximal clutch arrangement, the system may exhibit greater compactness which poses less space constraints on adjoining vehicle systems. Alternatively, the reverse clutch may be spaced away from the first forward clutch which may, however, decrease system compactness.

A gear 679 may reside on an output shaft 680 of the reverse clutch 670. Likewise, a gear 681 may reside on an output shaft 682 of the first forward clutch 672. Both gears 679, 681 may be rotationally attached to the system output shaft 671 via gears 683, 684 respectively. In this way, both the reverse clutch and the first forward clutch deliver power to the transmission's output, during different operating conditions.

The system output shaft 671 may include one or more interfaces 685 (e.g., yokes, gears, chains, combinations thereof, etc.). The output shaft is specifically illustrated with two outputs. However, the transmission may include an alternate numbers of outputs. The gear 679 is rotationally coupled to the output shaft via meshing with gear 683. Arrows 691 depict the flow of power from the transmission to drive axles 692 and/or other suitable downstream vehicle components or vice versa. A driveline with a shaft, joints, etc. may be used to carry out the power transfer between the transmission and the axles. It will be understood that the drive axles may include drive wheels.

The ring gear 666 of the second planetary gear set 650 may include the extension 686 with a gear 687 position thereon. The gear 687 may be rotationally attached to a gear 688 in the second forward clutch 674, as indicated via a dashed line. The gear 688 may be coupled to a first set of plates in the clutch 674. A second set of plates in the clutch may be attached to an output shaft 689 and a gear 690. The gear 690 may be rotationally coupled to the gear 683, as indicated by a dashed line. Due to the aforementioned arrangement of the clutches and the planetary gear sets, the transmission 600 achieves a higher efficiency and enhanced drivability, comfort, and productivity than previous hydromechanical transmissions.

The technical effect of the systems and control methods described herein is to efficiently and confidently anticipate events which may demand a supply of high pressure hydraulic fluid at various hydraulic devices in a hydraulic system, and to operate an electronically controlled relief valve accordingly to achieve a desired boost pressure in the hydraulic system sufficient to satisfy the pressure needs of all hydraulic devices at any given time.

FIGS. 1-2 and 6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a hydraulic system in a transmission is provided that comprises a boost pump; a relief valve in fluidic communication with the boost pump and a reservoir; a plurality of control valves in fluidic communication with the boost pump, positioned downstream of the relief valve, and in fluidic communication with a plurality of hydraulic devices; a controller including instructions that when executed, during transmission operation, cause the controller to: actively adjust a position of the relief valve based on an aggregate hydraulic pressure demand of the plurality of hydraulic devices to alter a boost pressure of a hydraulic fluid supplied to the plurality of control valves.

In another aspect, an automatic transmission is provided that comprises boost pump; a relief valve in fluidic communication with the boost pump and a reservoir; a plurality of control valves in fluidic communication with the boost pump, positioned downstream of the relief valve, and in fluidic communication with a hydraulic clutch and a hydrostatic pump; and a controller including instructions that when executed, during transmission operation, cause the controller to: determine an aggregate hydraulic pressure demand of the hydraulic clutch and the hydrostatic pump; and actively adjust a position of the relief valve based on the aggregate hydraulic pressure demand to augment a boost pressure of a hydraulic fluid supplied to the plurality of control valves; wherein the augmented boost pressure is less than a design pressure.

In yet another aspect, a method is provided for operation of a hydraulic system in a transmission, comprising: determining an aggregate hydraulic pressure demand of a plurality of hydraulic devices; and electronically controlling a pressure relief valve to dynamically adjust a boost pressure supplied to a plurality of control valves in fluidic communication with the plurality of hydraulic devices from a boost pump based on the aggregate hydraulic pressure demand. In one example, the aggregate hydraulic pressure demand may include an aggregate peak pressure and a maximum pressure. In another example, the aggregate peak pressure may be determined based on a flow trigger or a shift trigger corresponding to each of the plurality of hydraulic devices. In yet another example, the shift trigger may be associated with a hydraulic clutch and may include data indicative of an anticipated gear shift. In another example, the flow trigger may include data indicative of a high flow rate request of the associated hydraulic device. In another example, the associated hydraulic device may be a hydraulic clutch and the high flow rate request may correspond to a piston filling event. In yet another example, the aggregate pressure demand of the plurality of hydraulic devices may be determined in real-time.

In any of the aspects or combinations of aspects, the aggregate hydraulic pressure demand may be calculated based on a flow trigger or a shift trigger for each of the plurality of hydraulic devices.

In any of the aspects or combinations of the aspects, one of the plurality of hydraulic devices may be a hydraulic clutch and the shift trigger of the hydraulic clutch may include data indicative of an anticipated gear shift event.

In any of the aspects or combinations of the aspects, one of the plurality of hydraulic devices may be a hydrostatic pump and the flow trigger of the hydrostatic pump may include data indicative of a high flow demand event.

In any of the aspects or combinations of the aspects, actively adjusting the position of the relief valve based on the aggregate hydraulic pressure demand may include: calculating the maximum between an aggregate peak pressure and maximum pressure of the plurality of hydraulic devices to determine a boost pressure.

In any of the aspects or combinations of the aspects, actively adjusting the position of the relief valve based on the aggregate hydraulic pressure demand may include: applying saturation limits and/or a rate limiter to the aggregate peak pressure and maximum pressure; and determining a control current sent to the relief valve based on the aggregate peak pressure and maximum pressure.

In any of the aspects or combinations of the aspects, one or more characteristics of a pressure-current curve may be used to determine the control current sent to the relief valve.

In any of the aspects or combinations of the aspects, the hydraulic system may further comprise instructions that, when executed during an engine cranking event, cause the controller to: operate the relief valve to decrease the boost pressure to a lower pressure.

In any of the aspects or combinations of the aspects, the hydraulic system may further comprise instructions that, when executed during transmission operation, cause the controller to: determine the aggregate hydraulic pressure demand of the plurality of hydraulic devices in real-time.

In any of the aspects or combinations of the aspects, in anticipation of a gear shift event involving the hydraulic clutch, the aggregate hydraulic pressure demand may be determined based on a maximum supply pressure of the hydraulic clutch; and during a piston filling event of the hydraulic clutch, the aggregate hydraulic pressure demand may be determined based on a piston filling demand.

In any of the aspects or combinations of the aspects, the automatic transmission may further comprise instructions that, when executed during an engine cranking event, cause the controller to: operate the plurality of control valves to control the hydraulic clutch and the hydrostatic pump at or near a zero pressure; and operate the relief valve to decrease the boost pressure to a lower pressure.

In any of the aspects or combinations of the aspects, wherein the automatic transmission may be a hydromechanical variable transmission (HVT).

In another representation, a hydraulic assembly in a hydromechanical transmission is provided that comprises one or more hydraulically operated clutches and pumps and a controller designed control a relief valve coupled to a boost pump in real-time based on anticipated peak pressures and pressure demands of the hydraulically operated clutches and pumps, where the relief valve is coupled to a control valve for each of the hydraulically operated clutches and pumps.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the term "substantially" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydraulic system in a transmission, comprising:
   a boost pump;
   a relief valve in fluidic communication with the boost pump and a reservoir;
   a plurality of control valves in fluidic communication with the boost pump, positioned downstream of the relief valve, and in fluidic communication with a plurality of hydraulic devices; and
   a controller including instructions that when executed, during transmission operation, cause the controller to:
      actively adjust a position of the relief valve based on an aggregate hydraulic pressure demand of the plurality of hydraulic devices to alter a boost pressure of a hydraulic fluid supplied to the plurality of control valves, wherein the aggregate hydraulic pressure demand comprises calculating a maximum between an aggregate peak pressure and a maximum pressure of the plurality of hydraulic devices to determine a desired boost pressure.

2. The hydraulic system of claim 1, wherein the aggregate hydraulic pressure demand is calculated based on a flow trigger or a shift trigger of each of the plurality of hydraulic devices.

3. The hydraulic system of claim 2, wherein one of the plurality of hydraulic devices is a hydraulic clutch and the shift trigger of the hydraulic clutch includes data indicative of an anticipated gear shift event.

4. The hydraulic system of claim 2, wherein one of the plurality of hydraulic devices is a hydrostatic pump and the flow trigger of the hydrostatic pump includes data indicative of a high flow demand event.

5. The hydraulic system of claim 1, wherein actively adjusting the position of the relief valve based on the aggregate hydraulic pressure demand includes:
applying saturation limits and/or a rate limiter to the aggregate peak pressure and maximum pressure; and
determining a control current sent to the relief valve based on the aggregate peak pressure and maximum pressure.

6. The hydraulic system of claim 5, wherein one or more characteristics of a pressure-current curve are used to determine the control current sent to the relief valve.

7. The hydraulic system of claim 1, further comprising:
instructions that when executed, during an engine cranking event, cause the controller to:
operate the relief valve to decrease the boost pressure to a lower pressure.

8. The hydraulic system of claim 1, further comprising:
instructions that when executed, during transmission operation, cause the controller to:
determine the aggregate hydraulic pressure demand of the plurality of hydraulic devices in real-time.

9. A method for operation of a hydraulic system in a transmission, comprising:
determining an aggregate hydraulic pressure demand of a plurality of hydraulic devices; and
electronically controlling a pressure relief valve to dynamically adjust a boost pressure supplied to a plurality of control valves in fluidic communication with the plurality of hydraulic devices from a boost pump based on the aggregate hydraulic pressure demand;
wherein the aggregate hydraulic pressure demand includes an aggregate peak pressure and a maximum pressure.

10. The method of claim 9, wherein the aggregate peak pressure is determined based on a flow trigger or a shift trigger corresponding to each of the plurality of hydraulic devices.

11. The method of claim 10, wherein the shift trigger is associated with a hydraulic clutch and includes data indicative of an anticipated gear shift event.

12. The method of claim 10, wherein the flow trigger includes data indicative of a high flow rate request of the associated hydraulic device.

13. The method of claim 12, wherein the associated hydraulic device is a hydraulic clutch and the high flow rate request corresponds to a piston filling event.

14. The method of claim 9, wherein the aggregate hydraulic pressure demand of the plurality of hydraulic devices is determined in real-time.

15. An automatic transmission, comprising:
a boost pump;
a relief valve in fluidic communication with the boost pump and a reservoir;
a plurality of control valves in fluidic communication with the boost pump, positioned downstream of the relief valve, and in fluidic communication with a hydraulic clutch and a hydrostatic pump; and
a controller including instructions that when executed, during transmission operation, cause the controller to:
determine an aggregate hydraulic pressure demand of the hydraulic clutch and the hydrostatic pump; and
actively adjust a position of the relief valve based on the aggregate hydraulic pressure demand to augment a boost pressure of a hydraulic fluid supplied to the plurality of control valves.

16. The automatic transmission of claim 15, wherein:
in anticipation of a gear shift event involving the hydraulic clutch, the aggregate hydraulic pressure demand is determined based on a maximum supply pressure of the hydraulic clutch; and
during a piston filling event of the hydraulic clutch, the aggregate hydraulic pressure demand is determined based on a piston filling demand.

17. The automatic transmission of claim 15, further comprising instructions that when executed, during an engine cranking event, cause the controller to:
operate the plurality of control valves to control the hydraulic clutch and the hydrostatic pump at a prefill pressure level; and
operate the relief valve to decrease the boost pressure to a lower pressure.

18. The automatic transmission of claim 15, wherein the automatic transmission is a hydromechanical variable transmission (HVT).

* * * * *